April 17, 1928.  H. KEMPF ET AL  1,666,705
FISHING ROD HOLDER
Filed April 22, 1925
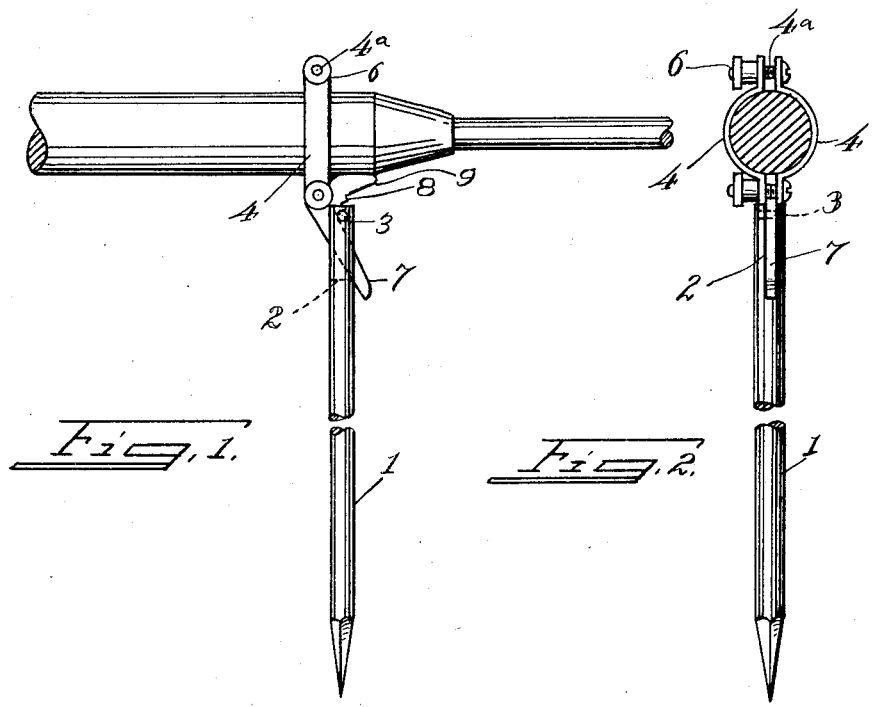
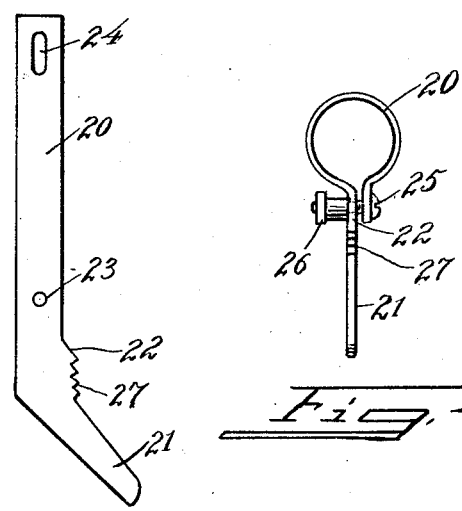
INVENTORS
Henry Kempf
Albert Kufes
BY
Allen & Allen
ATTORNEYS.

Patented Apr. 17, 1928.

1,666,705

UNITED STATES PATENT OFFICE.

HENRY KEMPF AND ALBERT KIEFER, OF CINCINNATI, OHIO.

FISHING-ROD HOLDER.

Application filed April 22, 1925. Serial No. 24,923.

Our invention relates to holders for fishing rods in which a device is provided to support a fishing rod at a desired angle, from which device the rod can be quickly and easily withdrawn by the fisherman, but from which the rod cannot be dislodged by a forward pull, as exerted by a fish.

In devices of the past for the purpose indicated it has been the practice to insert the end of the rod in a tubular holder or between two clips, from which the rod had to be withdrawn by pulling it forwardly. In the use of devices of this character a careless mounting of the rod might result in a fish pulling it away, when the fisherman was not observing it, and also the fisherman in his excitement of getting a bite would have difficulty in pulling the rod out, and would be most likely to pull up the holder post and all, in his effort to lose no time in properly hooking his catch.

In our device the object is to provide a holder from which the rod can be lifted in a natural movement by a person standing behind or over the holder, and to provide an inexpensive but strong device which will serve the several requirements of safety and ease of operation without complicated mechanism.

We accomplish our object by that certain construction and arrangement of parts to be hereinafter more specifically pointed out and claimed.

In the drawing:

Figure 1 is a side elevation of our device showing the handle of a rod in place.

Figure 2 is a section taken through the handle of the rod showing the device in front elevation.

Figure 3 is a plan view of a blank from which another form of the rod attachment piece can be formed.

Figure 4 is an elevation of the device formed from the blank of Figure 3.

The mounting device in our construction is shown in the form of a long spike 1, the top of which is bifurcated as indicated at 2. Across the upper end of the bifurcated portion a pin 3 is arranged to cross the opening between the tines and connect them together. It will be evident that the upper portion of this spike device is the only essential. A spike shank and point are shown, as providing a convenient way of securing a holder in the ground. For a boat some kind of an engaging means for the spike could readily be provided.

In one form of the device a pair of half rings 4 are provided which are held together by means of a pair of clamping screws 4$^a$ having thumb nuts 6. On the lower one of the screws is swung a hook device, having a long arm 7 of a thickness suitable to be inserted in the fork below the pin therein, and with teeth 8 on its inner face to engage over the pin. The angle of the rod will depend upon which tooth is set over the pin.

The upper member of the hook portion as shown at 9, abuts against the face of the handle of the fishing rod. The teeth may be considered as part of the arm 9.

The device shown is mounted on the handle of the rod above the reel, and is set in place by inserting the tongue or arm 7 into the fork, and letting the desired tooth rest on the pin. To detach, the rod is merely lifted up, so that the tongue slides out of the fork. The tongue will be made long enough to pass clear through the fork and rest against the base thereof, which prevents the rod from being withdrawn forwardly of the fork, and the general balance of the rod will hold it in position with the arm 7 in this position.

In another form of the device, a plate has a portion 20 which is to be bent into a rod encircling band, and a tongue 21, and a portion 22, similar to the two tongues of the hinged hook portions 7 and 9. A hole 23 for a clamp screw is provided and a slot 24 for the same screw giving range of adjustability when the device is clamped to the handle of the fishing rod. In Figure 4 this device is shown formed into a rod surrounding ring, with the clamp screw 25 having the head 26, which is tightened down after the ring or band has been sprung over the rod handle. This structure operates in the same way as the form first described, although it has slightly less flexibility in quickly withdrawing the rod. It has teeth 27 corresponding to the teeth 8.

It will be evident that other modifications would readily be made in our structure, which essentially consists of a mechanism secured fast to the rod handle, and a slotted member secured to any permanent fastening, into which a portion of the mechanism is inserted, thereby permitting the rod to rest in angled position by gravity, and to be withdrawn rearwardly only.

Having thus described our invention, what we claim as new and desire to secure by Letters Patent, is:—

A fishing rod holder comprising a member adapted to be secured to an anchorage, and having a slot therein, with an element crossing said slot above the base thereof, and means secured to the rod having a member to extend through said slot and engage the base thereof, and a member to rest against said element, said members comprising a pair of diverging tongues, one of which enters the slot and the other of which lies on said element, said tongues having notches formed in the crotch dividing them from each other, for the purpose described.

HENRY KEMPF.
ALBERT KIEFER.